US009110868B2

(12) United States Patent
Déjean (10) Patent No.: US 9,110,868 B2
(45) Date of Patent: Aug. 18, 2015

(54) SYSTEM AND METHOD FOR LOGICAL STRUCTURING OF DOCUMENTS BASED ON TRAILING AND LEADING PAGES

(75) Inventor: Hervé Déjean, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 1131 days.

(21) Appl. No.: 12/974,843

(22) Filed: Dec. 21, 2010

(65) Prior Publication Data

US 2012/0159313 A1 Jun. 21, 2012

(51) Int. Cl.
*G06F 17/00* (2006.01)
*G06F 17/21* (2006.01)

(52) U.S. Cl.
CPC ............ *G06F 17/211* (2013.01); *G06F 17/212* (2013.01)

(58) Field of Classification Search
CPC .............................. G06F 17/212; G06F 17/211
USPC .......................................... 715/243–247, 255
See application file for complete search history.

(56) References Cited

U.S. PATENT DOCUMENTS

| 5,784,487 | A * | 7/1998 | Cooperman | 382/175 |
| 5,848,184 | A * | 12/1998 | Taylor et al. | 382/173 |
| 7,281,209 | B2 * | 10/2007 | Nara et al. | 715/255 |
| 7,912,829 | B1 * | 3/2011 | Mathes et al. | 707/707 |
| 8,196,030 | B1 * | 6/2012 | Wang et al. | 715/200 |
| 2004/0237026 | A1 * | 11/2004 | Aust | 715/500 |
| 2005/0237572 | A1 * | 10/2005 | Mori et al. | 358/1.17 |
| 2006/0033967 | A1 * | 2/2006 | Brunner | 358/474 |
| 2006/0155700 | A1 | 7/2006 | Dejean | |
| 2006/0155703 | A1 | 7/2006 | Dejean | |
| 2006/0156226 | A1 * | 7/2006 | Dejean et al. | 715/517 |
| 2006/0248070 | A1 * | 11/2006 | Dejean et al. | 707/5 |
| 2006/0259856 | A1 * | 11/2006 | Atkins | 715/517 |
| 2006/0274938 | A1 * | 12/2006 | Ortega et al. | 382/173 |
| 2007/0177208 | A1 * | 8/2007 | McCall et al. | 358/1.18 |
| 2007/0196015 | A1 | 8/2007 | Meunier | |
| 2007/0273895 | A1 * | 11/2007 | Cudd et al. | 358/1.1 |
| 2008/0114757 | A1 | 5/2008 | Dejean | |
| 2009/0086275 | A1 * | 4/2009 | Liang et al. | 358/3.21 |
| 2009/0110268 | A1 | 4/2009 | Dejean | |

(Continued)

OTHER PUBLICATIONS

Emmanuel Giguet, Alexandre Baudrillart, Nadine Lucas, "Resurgence for the Book Structure Extraction Competition", INEX 2009 workshop preproceedings. Brisbane, Australia. pp. 136-142 (2009).

(Continued)

*Primary Examiner* — Thu Huynh
(74) *Attorney, Agent, or Firm* — Fay Sharpe LLP (57) ABSTRACT

A system, method, and computer program product for determining the structure of a document are provided. The method includes receiving a set of document pages for a document and linking one page frame to each of a plurality of document pages in the set. For each document page linked to a page frame, a content bounding box surrounding the content on the document page is identified, and the document page categorized, based at least in part on the geometrical relationship between the page frame and the content bounding box of the document page. The document page can then be identified as a logical cut based at least in part on the categorization of the document page. Information, such as a table of contents or updated table of contents, can then be output, based on the determined logical unit(s) of the document.

26 Claims, 6 Drawing Sheets

(56) References Cited

U.S. PATENT DOCUMENTS

| | | |
|---|---|---|
| 2009/0187535 A1* | 7/2009 | Warnock et al. .................. 707/2 |
| 2009/0192956 A1 | 7/2009 | Dejean |
| 2010/0107045 A1 | 4/2010 | Filippova |
| 2010/0306260 A1 | 12/2010 | Dejean |
| 2011/0145701 A1 | 6/2011 | Dejean |
| 2011/0225490 A1* | 9/2011 | Meunier ....................... 715/255 |
| 2011/0276874 A1 | 11/2011 | Dejean |
| 2012/0079370 A1 | 3/2012 | Dejean |

OTHER PUBLICATIONS

Bodin Dresevic, Aleksandar Uzelac, Bogdan Radakovic, and Nikola Todic, "Book Layout Analysis: TOC Structure Extraction Engine", Advances in Focused Retrieval, Lecture Notes in Computer Science, vol. 5631. ISBN 978-3-642-03760-3. Springer Berlin Heidelberg, p. 180-187 (2009).

Hervé Déjean, Jean-Luc Meunier, "XRCE Participation to the Book Structure Task", Xerox Research Centre Europe, Proceedings of INEX 2009, pp. 143-152 (2009).

* cited by examiner

SYSTEM AND METHOD FOR LOGICAL STRUCTURING OF DOCUMENTS BASED ON TRAILING AND LEADING PAGES

CROSS REFERENCE TO RELATED PATENTS AND APPLICATIONS

The following copending applications, the disclosures of which are incorporated herein by reference in their entireties, are mentioned:

U.S. application Ser. No. 12/892,138, filed Sep. 28, 2010, entitled SYSTEM AND METHOD FOR FRAME DETECTION, by Hervé Déjean (hereinafter, "Déjean");

U.S. application Ser. No. 12/773,125, filed May 4, 2010, entitled SYSTEM AND METHOD FOR UNSUPERVISED GENERATION OF PAGE TEMPLATES, by Hervé Déjean; and U.S. application Ser. No. 11/032,814, filed Jan. 10, 2005, entitled METHOD AND APPARATUS FOR DETECTING A TABLE OF CONTENTS AND REFERENCE DETERMINATION, by Hervé Déjean.

BACKGROUND

The exemplary embodiment relates to document processing. It finds particular application in connection with a system and method for the unsupervised determination of a logical structure of a document based on trailing and leading pages.

There are a large number of existing documents that do not have a table of contents (TOC), or that have a TOC that is out of date and unreliable. This may occur when a large book is digitally scanned to generate a digital document, or when the content of a digital document is updated without creating and/or updating a corresponding TOC. The lack of a reliable TOC for a document makes it more difficult to determine quickly and efficiently whether a document contains a particular piece of information and if so, where in the document the information is located. Existing methods for determining the logical structure of a document (and by extension, a TOC for the document) are computationally expensive and are prone to skewed results. An example of such a method is described in Emmanuel Giguet, Alexandre Baudrillart and Nadine Lucas, "Resurgence for the Book Structure Extraction Competition," INEX 2009 Workshop Pre-proceedings (hereinafter, "Giguet"). Giguet utilizes a four-page sliding window that is used to detect chapter transitions. However, this method is computationally expensive because it computes data for at least four pages at a time and compares the four pages of each four page window to determine chapter transitions. Accordingly, it is desirable to have a more efficient and reliable method of determining the logical structure of a document.

INCORPORATION BY REFERENCE

The following references, the disclosures of which are incorporated herein by reference in their entireties, are mentioned:

U.S. Pub. No. 2006/0156226, published Jul. 13, 2006, entitled METHOD AND APPARATUS FOR DETECTING PAGINATION CONSTRUCTS INCLUDING A HEADER AND A FOOTER IN LEGACY DOCUMENTS, by Hervé Déjean, et al. (hereinafter the "'226 publication").

U.S. application Ser. No. 12/719,982, filed Mar. 9, 2010, entitled DOCUMENT ORGANIZING BASED ON PAGE NUMBERS by Jean-Luc Meunier, et al.

BRIEF DESCRIPTION

In accordance with one aspect of the exemplary embodiment, a method for determining a structure of a document is provided. The method includes receiving a set of document pages for a document into computer memory, and using a computer processor, linking one page frame to each of a plurality of document pages in the set. For each document page linked to a page frame, a content bounding box surrounding the content on the document page is determined. The document page is categorized based on a geometrical relationship between the page frame and the content bounding box of the document page. The method further includes determining whether the document page is a logical cut for a logical unit of the document based on the categorization of the document page, and outputting information based on the determined logical unit.

In another aspect, a system for determining a structure of a document is provided. The system includes memory for storing a set of document pages for a document, a page frame detection module adapted to link one page frame to each page in the set of document pages, and a content bounding box detection module adapted to, for each page of the set of document pages, determine a content bounding box surrounding the content on the document page. The system further includes a page categorization module adapted to, for each page of the set of document pages, categorize the document page based at least in part on the geometrical relationship between the page frame and the content bounding box of the document page, and a logical unit detection module adapted to, for each page in the set of document pages, determine whether the document page is a logical cut for a logical unit of the document, based on the categorization of the document page.

In another aspect, a computer program product includes a non-transitory recording medium encoding instructions which, when executed on a computer, causes the computer to receive a set of document pages for a document, link at most one page frame to each of a plurality of document pages in the set, and for each document page linked to a page frame, determine a content bounding box surrounding the content on the document page. The document page is categorized based on a geometrical relationship between the page frame and the content bounding box of the document page. The categorizing includes determining whether the geometrical relationship indicates one of a trailing page and a leading page. The method further includes determining whether the document page constitutes a logical cut for a logical unit of the document based on the categorization of the document page. Information is associated with the document based on identified logical cuts within the document.

DETAILED DESCRIPTION

Aspects of the exemplary embodiment relate to determining the logical structure of documents based on detected trailing and/or leading pages. The exemplary embodiment relies on the detection of one or more page frames for a document and a determination of a bounding box for each page in the document, or at least for a set of such pages. The exemplary page frame is computed at the document level, which simplifies the method compared to existing methods which work entirely at the page level.

The exemplary method/system identifies the structure, e.g. sections, of a document by leveraging the detection of leading and trailing pages. These are pages containing a substantial white space at the top or bottom of the document page, respectively. The exemplary embodiment presented herein may utilize the method and system described in Déjean which detects content page frames of a document. The page frames, in conjunction with bounding boxes surrounding the content of a page, are useful in the present method for detecting white space on document pages and classifying the pages as leading or trailing pages. Rules are applied to the detected leading and trailing pages to determine logical cuts between document sections. Subsequently, the title of each document section may be extracted using simple heuristics. These titles can be used to create and/or validate a table of contents (TOC) for the document. In this manner, the exemplary method/system is helpful in the context of mass digitization of documents and ebook creation.

A "document" is used herein to mean an electronic (e.g., digital) or physical (e.g., paper) recording of information. In one exemplary embodiment, a hardcopy document, such as a book, is scanned to provide a set of ordered document pages (page scans) from the same document, each page scan comprising a bitmap. At least some of the bitmaps comprise arrangements of pixels that are recognizable by an OCR engine as text elements. A scanned document can thus be a collection of multiple page scans ("pages"). The set of pages processed in the exemplary method may include at least four pages or at least fifty pages from a single document, and may include all pages of a document. The document can be any number of pages, such as up to 1,000 pages or more. The method and system are particularly suited to scanned pages. However, it is also applicable to pages in a page description language such as PDF which are converted to another format where some noise is introduced in the conversion. For convenience, reference will be made throughout to scanned pages which have been processed to identify content, bearing in mind that other formats are also contemplated.

Each OCR-processed page scan can be considered to contain zero or more objects, the objects including text objects (such as page headers, footers, main text blocks, lines of text, etc.) and/or non-text objects (such as graphical or photographic images). In addition to the page content (i.e., objects derived from the original hardcopy document page), the page scan may also include noise, such as textual and/or non-textual noise. The textual noise, and in some cases, the non-textual noise, may be recognized as objects of the page by the OCR engine.

A "page frame" is defined as a (rectangular) page zone where the page content elements are laid out. The page frame is a complementary zone to the page margins. Together, the page frame and page margins encompass the entire page. In the exemplary embodiment, to compute this rectangle, additional information other than the current processed page may be employed. The page frame is computed considering all (or at least some) of the pages of the document. Since the page frame is identified on a multiple page (e.g., overall document) basis, rather than for each individual document page, the page frame assigned to a page of the document may not exactly match the page content of that page. The page frame for a given page can thus include, within it, white space at one or more of top, bottom, and sides of the page content objects and can exclude some objects, which are objects derived from a neighboring page. This contrasts with the conventional definition of a page frame as being the smallest rectangle encompassing the page content objects. The page frame has parallel upper and lower horizontal edges, which define the upper and lower limits of the computed page frame.

A "bounding box," as used herein, is the smallest rectangle that encloses all the detected objects of a page scan (a document image) and is computed for each page of the document. The detected objects, e.g., those detected through optical character recognition (OCR), can include text objects of a current page, but can also include detected images (where the OCR processor detects images) and can include textual noise detected on an adjacent page. As will be appreciated, for a given scanned document page, the bounding box may be smaller or larger than the assigned page frame. The bounding box has parallel upper and lower horizontal edges, which define the upper and lower limits of the computed bounding box. In general, each page is assigned exactly zero or one bounding box.

The words "top" and "bottom," "upper," and "lower," and the like, with respect to a page, refer to the upper and lower ends of a page as these would be viewed when being read by a reader.

"White space" refers to a rectangular region within a page frame which is free of objects, i.e., all pixels are white ('off'), or which contains objects which can be detected as being headers and footers, e.g., are repeated on multiple pages or which have a value which increments from one page to the next (page numbers). A white space region within a document page extends from the left to right edges of the page frame and vertically between the top (or bottom) edge of the page frame to the nearest edge of the content bounding box.

Figure 1:
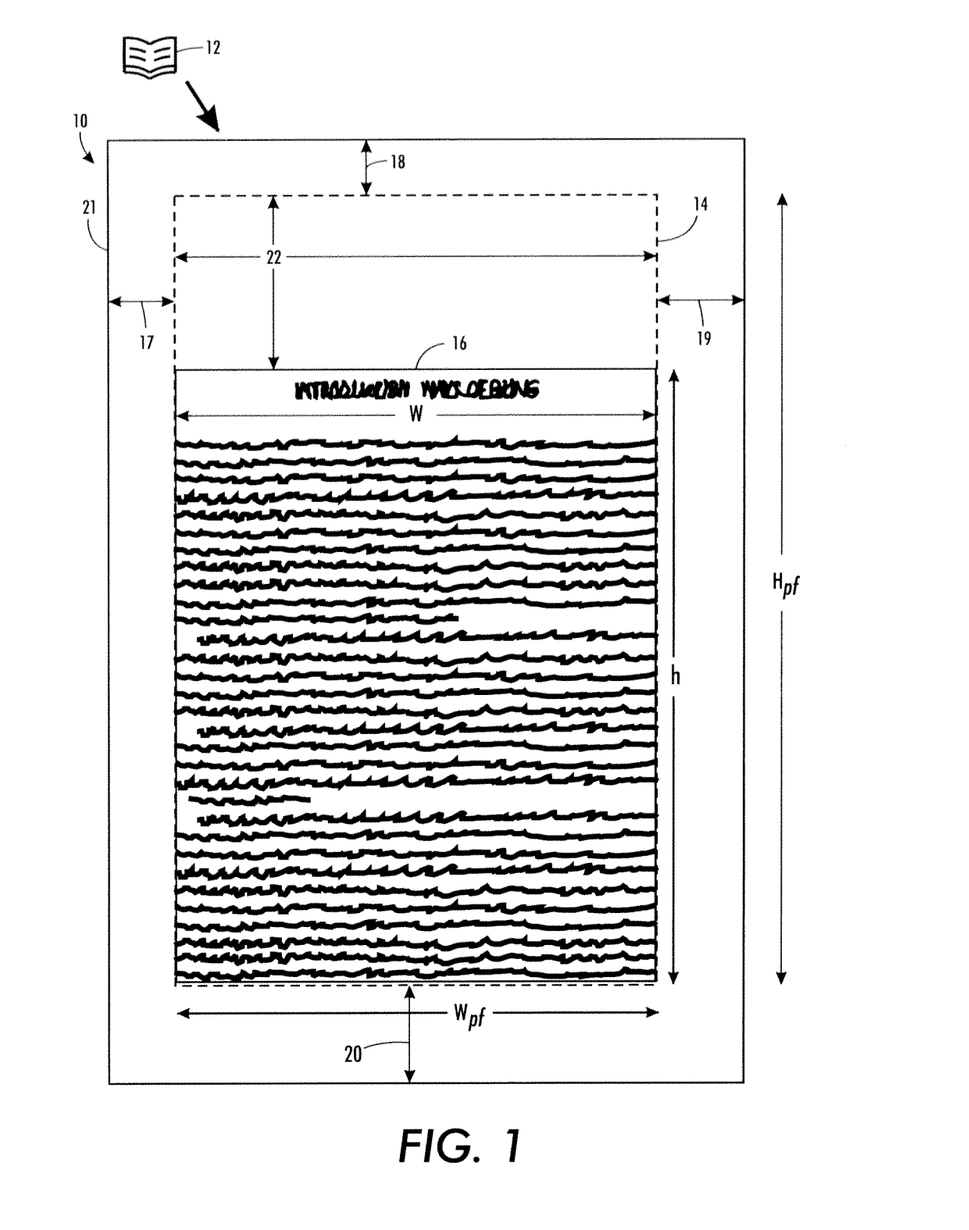
FIG. 1 is a schematic view of a scanned page of a book illustrating a page frame and a bounding box.

For example, as shown in FIG. 1, a schematic drawing of a digital page 10 generated by scanning a page of a hardcopy book 12 is shown. The page 10 includes a page frame 14 and a content bounding box 16 surrounding the content of the page. The page 10 also includes four margins 17, 18, 19, 20 between the perimeter 21 of the page 10 and the page frame 14. The margins 17-20, together with the page frame 14, cover the entire page 10. As will be appreciated, not all of the computed page frames 14 for a given document need have four margins. For example, one or more edges of the page frame 14 may be collinear with the page perimeter 21. An area between the page frame 14 and the content bounding box 16 is considered white space 22. This white space 22 is used by the exemplary method/system to identify leading pages and trailing pages. The page 10 illustrated in FIG. 1 is considered a leading page since there is white space 22 at the top of the page frame 14. Such a page may be considered as a logical cut representing the beginning of a section of the book, such as the beginning of a chapter.

Figure 2:
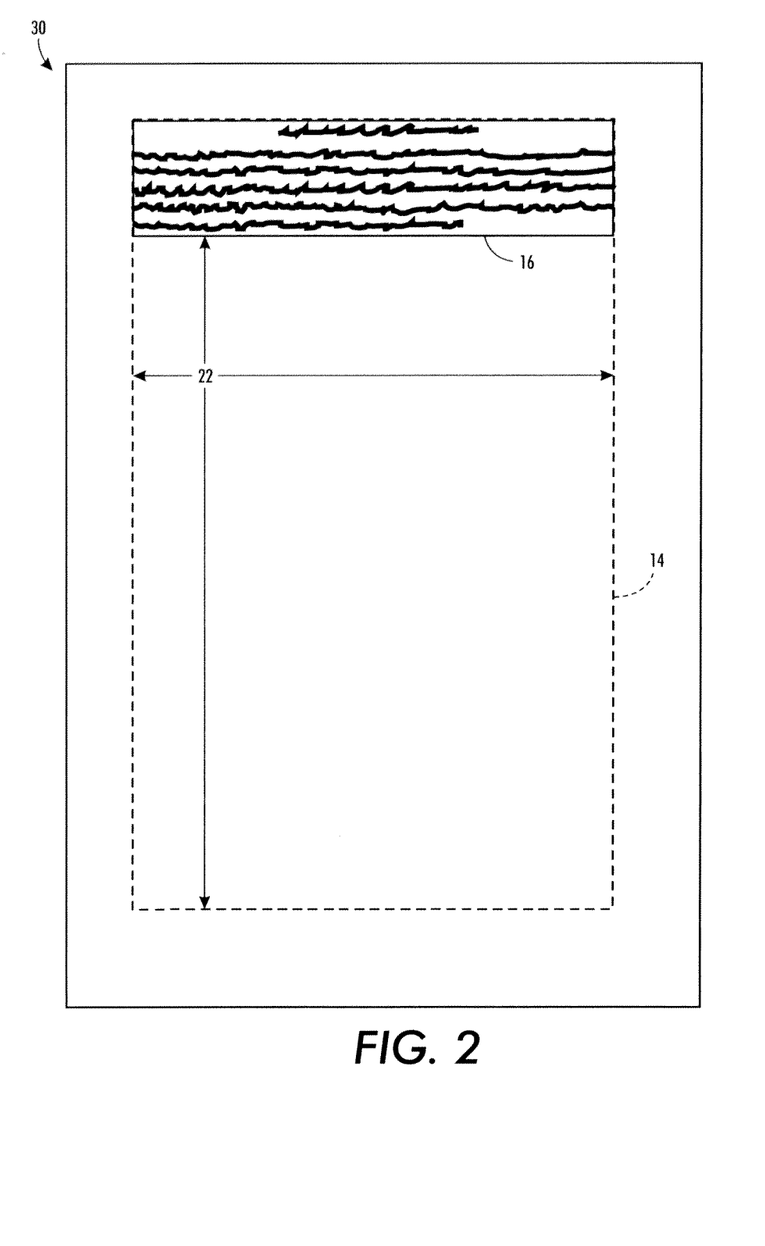
FIG. 2 is a schematic view of a second scanned page of a book illustrating a page frame and a bounding box.

FIG. 2 illustrates an example of a trailing page 30, since it has a content bounding box 16 which is located at the top of the page frame 14 with white space 23 at the bottom of the page frame 14. Such a page may be considered as a logical cut representing the end of a section of the book, such as the end of a chapter.

Figure 3:
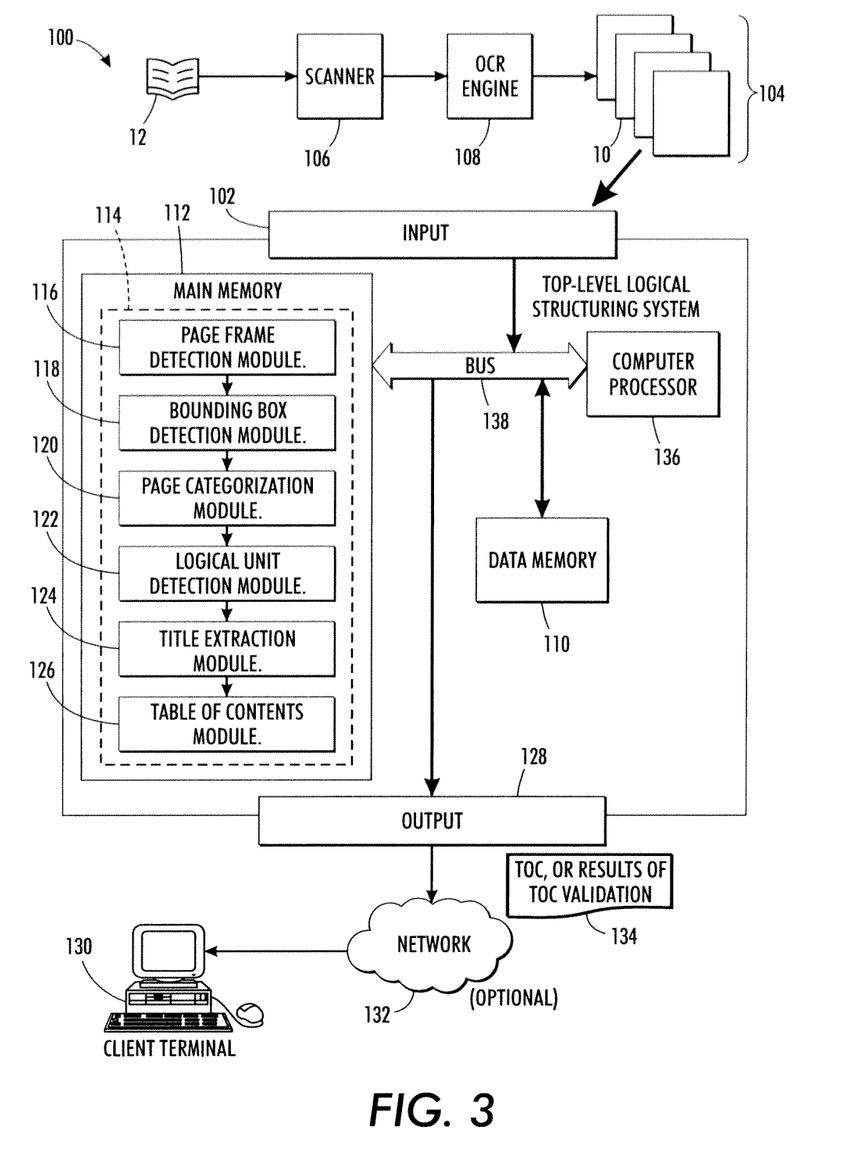
FIG. 3 illustrates a system for a detecting the logical structure of a document.

FIG. 3 illustrates an exemplary system 100 for determining the logical structure of a document based on trailing and leading pages. The system 100 is a non-transitory device which includes an input device 102 for receiving a set 104 of scanned and OCR'd document pages 10 for a multipage document 12. In the alternative, any digitized document containing multiple pages (whether scanned from a physical representation or not) may be input into the system 100. The exemplary system 100 may process a collection of documents either in parallel or serially, or may process documents singly. Prior to inputting, the document pages 10 may be stored in any suitable tangible storage media such as a disk, ROM or RAM, or may be input into the system 100 in the form of a carrier wave, e.g., via the Internet. The input device 102 may include a modem link, a wired or wireless connection, USB port, floppy or hard disk receiver, or the like and may be separated or combined with other components of the system 100. As will be appreciated, a scanner 106 or other digital image capture device, and an Optical Character Recognition (OCR) engine 108 for processing the output of the scanner 106 to generate the set 104 of document pages 10 may be provided. In the exemplary embodiment, these are shown as separate components, with the input device 102 receiving the processed pages 10 of a document therefrom, although it is contemplated that components 106, 108 could form a part of the system 100 (for example, the system 100 could be implemented in a scanner with an OCR engine).

The system 100 includes data memory 110 for storing the set 104 of document pages 10 during processing. Main memory 112 of the system 100 stores instructions 114 for performing the exemplary method, including a page frame detection module 116, a bounding box detection module 118, a page categorization module 120, a logical unit detection module 122, a title extraction module 124, and a table of contents module 126. Outputs from modules 114, 116, 118, 120, 122, 124, 126 may be stored in memories 110, 112 and/or output via an output device 128 to a client terminal 130, optionally through a wired or wireless network 132, such as the Internet.

The page frame detection module 116 receives as input the set 104 of pages 10 via the input device 102, and detects one or more page frames 14 (FIG. 1) for the set of pages 10. Each page of the set (document) will be assigned exactly zero or one of these page frames (in the exemplary embodiment, no page frame is assigned to a blank page). The page frame detection module 116 may utilize the method described in Déjean, which detects content page frames of a document. In the alternative, any other method that is configured for detecting page frames based on the content of multiple pages, rather than only on that page to which the page frame is assigned, may be employed by the page frame detection module 116. The output of the page frame detection module 116 is a page frame assigned to each page 10 of the input set 104. The output from the module 116 may be stored in memory 110, 112 until required for later processing.

The bounding box detection module 118 detects, for each page 10 in the set 104 of input pages, the smallest rectangle encompassing the page content objects of each page. This rectangle is the bounding box 16 (FIG. 1), which is then output to the page categorization module 120. In the exemplary embodiment, the bounding box detection module 118 also provides the computed bounding boxes 16 of multiple pages 10 to the page frame detection module 116 for computing page frames 14 therefrom.

Figure 4:
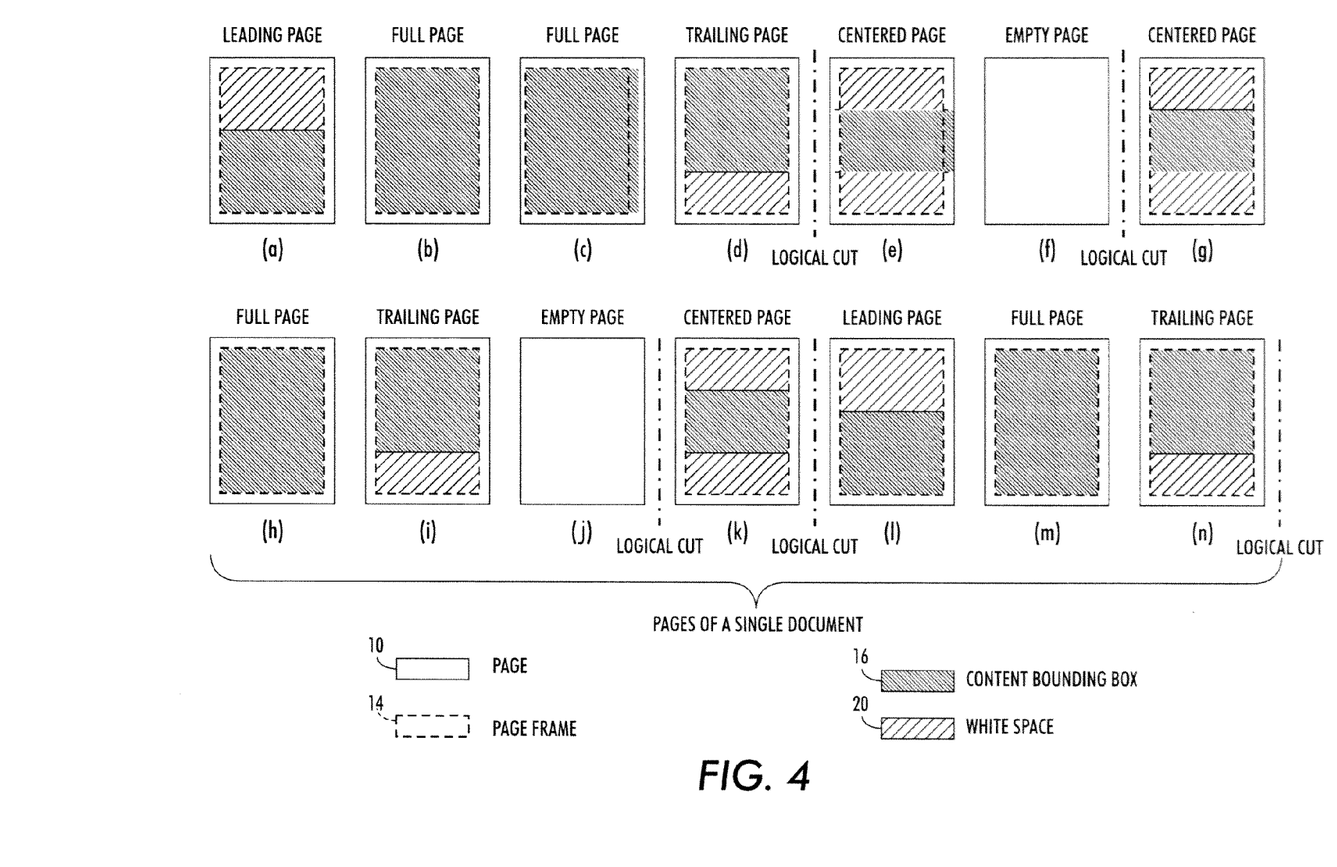
FIG. 4 schematically illustrates fourteen categorized hypothetical pages of an example input document.

The page categorization module 120 receives as input, for each page of the document, the page frame 14 from the page frame detection module 116, and the bounding box 16 from the bounding box detection module 118. The associated white space (if any) of each page is computed based on the overlap of these two areas. Specifically, it is determined by subtracting the area of the bounding box 14 that overlaps the page frame from the page frame. The page categorization module 120 then categorizes each page, based on the computed white space area. In the exemplary embodiment a page is categorized as being one of an empty page, a full page, a leading page, a trailing page, a centered page, and a noisy page, depending on the geometrical relationship between the page frame and the bounding box. Fewer or more categories could be considered, which allow pages indicative of a logical page break to be distinguished from other pages. Generally, an empty page is a page having no content (i.e., no content bounding box). A full page is a page having a content bounding box that fills the entire (or almost entire) page frame, such as the bounding box occupies at least a threshold height/height ratio of the page frame. A leading page is a page having a content bounding box at or near the bottom of the page frame and white space occupying a substantial area of the top portion of the page frame. For example, at least a threshold height/height ratio of the page frame beginning from the top of the lower margin 20 is white space. A trailing page is a page having a content bounding box at or near the top of the page frame and white space occupying a substantial area of the bottom portion of the page frame. For example, at least a threshold height/height ratio of the page frame beginning from the bottom of the upper margin 18 is white space. A centered page is a page having a content bounding box 16 with roughly equal heights of white space both above and below the bounding box. A noisy page is a page with no detected page frame having at least one or a plurality of pixels that are non-white (i.e., the page has pixels that are 'on'). A noisy page may be caused by, for example, a blank page having an errant or stray mark caused by a reproduction error. FIG. 4 illustrates an exemplary document as a sequence of the categorized pages within it. A more detailed explanation of each page category is described below with respect to the method illustrated by FIG. 5. The output of the page categorization module 120 is an assignment of a single page category for each page in the document.

The logical unit detection module 122 receives as input the page category assigned to each page of the document and outputs information corresponding to the logical units (sections) of the input document. The module 122 operates by applying one or more rules to the input page categories to determine the page boundaries for logical units of the document. A logical unit in a document includes a page labeled as a first page and all subsequent pages until the page immediately preceding the next page labeled as a first page (or until the end of the document if there is not another labeled first page). Thus, the pages labeled as first pages are logical cuts in the document that signal the beginning of a logical unit, and by extension, the end of the logical unit immediately preceding the logical cut. The rules for determining logical units of the document include, but are not limited to, (1) labeling a page as the first page of a logical unit if the page is categorized as a leading page, (2) labeling a page as the first page of a logical unit if the page immediately preceding the page is categorized as a trailing page, and (3) labeling a page as the first page of a logical unit if the page is categorized as a centered page. In the example shown in FIG. 4, for example, pages a, d, g, i, k, l, and n may be designated as logical cuts, from which, for example, pages a-d or a-f could be designated as a logical unit.

The title extraction module 124 receives as input the first page of each logical unit identified by the logical unit detection module 122. The module 124 then extracts, where present, a title from each identified first page using any available title extraction method. Accordingly, the output of the title extraction module 124 is a set of extracted titles along with an identification (such as a page number) of the corresponding page.

The table of contents module 126 receives as input the extracted titles and corresponding page identification information from the title extraction module 124. The table of contents module then constructs a table of contents from the extracted titles, or validates an existing table of contents by comparing the extracted titles and page numbers against the table of contents. The output 134 of the table of contents module 126 is either a table of contents or a validation metric corresponding to an existing table of contents for the input document 104.

In the exemplary embodiment, components 114, 116, 118, 120, 122, 124, 126 comprise software instructions stored in main memory 112, which are executed by a computer processor 136. The processor 136, such as the computer's CPU, may control the overall operation of the computer system 100 by execution of processing instructions stored in memory 112. Components 102, 110, 112, 114, 116, 118, 120, 122, 124, 126, 128, 136 may be connected by a data control bus 138.

As will be appreciated, system 100 may include fewer or more components while still having the same functionality. For example, components 116, 118, 120, 122, 124, 126 may be combined to form fewer components, or may be functionally separated to form more individual components.

The system 100 may comprise one or more computing devices, such as a personal computer, PDA, laptop computer, server computer, or combination thereof. Memories 110, 112 may be integral or separate and may represent any type of computer readable medium such as random access memory (RAM), read only memory (ROM), magnetic disk or tape, optical disk, flash memory, or holographic memory. In one embodiment, the memories 110, 112 comprise a combination of random access memory and read only memory. In some embodiments, the processor 136 and memory 110 and/or 112 may be combined in a single chip.

The system 100 may output the information 134 to an output device, such as a client terminal 130, a server, a printer, or the like. The output device 128 may be connected directly with the system 100 or linked thereto, e.g., via a wired to wireless link 132, such as a local area network, wide area network, or the Internet. The system 100 or client terminal 130 may generate a graphical user interface (GUI) for display to a user. The exemplary GUI (not shown) enables a user to interact with the system 100 via the display screen of the client terminal 130 with a user input device, such as a cursor control device, keyboard, keypad, joystick, or the like. In the exemplary embodiment, the client terminal 130 may include a web browser which allows the user to interact with the system 100, which may be implemented by a server computer.

The term "software" as used herein is intended to encompass any collection or set of instructions executable by a computer or other digital system so as to configure the computer or other digital system to perform the task that is the intent of the software. The term "software" as used herein is intended to encompass such instructions stored in a storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 5:
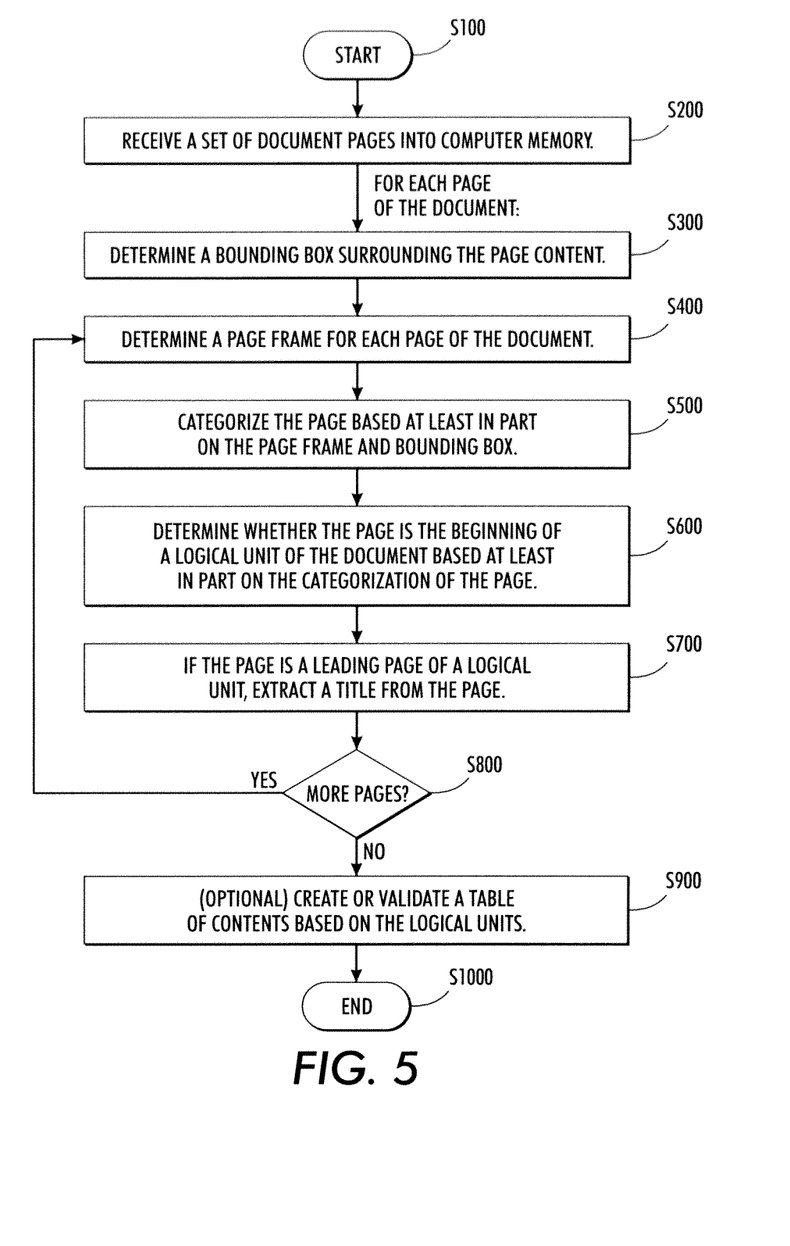
FIG. 5 is a flow chart illustrating a method for detecting the logical structure of a document that may be performed on the system of FIG. 3.

FIG. 5 illustrates an exemplary method for structuring of a document by detecting logical cuts, such as leading and trailing pages. The method may be performed on the exemplary system detailed in FIG. 3. The method begins at S100.

At S200, the logical structuring system 100 receives into memory 110 and/or 112 a set 104 of digitized pages 10 from a document 12, such as a set of scanned and OCR'd document pages.

At S300, the bounding box detection module 118 detects, for each page in the set of input pages 104, the smallest rectangle encompassing the page content objects of the page. That is, for each page having one or more detected objects, dimensions of the bounding box of the page content are computed. FIGS. 1 and 2 illustrate a bounding box 16 that encompasses the content of the page. In some embodiments, content within a header or footer of the page (such as a page number) is ignored when computing the bounding box 16. Ignoring such content avoids including elements of a page that may not be helpful in determining the meaningful content of a page with respect to document structure. Each bounding box has a width (w), height (h) and location (such as the top left corner of the box relative to the page boundary) with respect to the page.

At S400, the page frame detection module 116 determines one or more page frames 14 (FIG. 1) for the set 104 of pages. As stated above with respect to the system of FIG. 3, the page frame detection module 116 may utilize the method described in Déjean which detects content page frames of a document. At a high level, the page frame detection method of Déjean computes a bounding box for each page of the document that is the smallest rectangle that encloses all of the content of a page (as described above, for S300). The page frame detection method also determines the margins for each page (i.e., the left, right, top and bottom margins) between the computed bounding box and the outer perimeter of the page. The method then computes a first histogram based on the bounding box dimensions for all of the document pages, and a second histogram based on the margin dimensions for all of the document pages. A "computed page frame" is then generated for the document by identifying frequent bounding box dimensions and page margins from the first and second histograms. The computed page frame is then compared to some or all of the document pages, and any pages that are deemed to match the computed page frame are then linked with the computed page frame. For each page that is linked to a given page frame, the page frame is positioned on the page to best fit the content of that page. This means that each page that is linked to a given page frame has a page frame 14 of the same height ($H_{pf}$) and width ($W_{pf}$) (FIG. 1), although the margins may have different dimensions, as a result of the positioning of the page frame on the page. It is to be noted that although in FIG. 1 the bounding box width w is shown as being identical to the page frame width $W_{pf}$, this is not necessarily the case.

Since a single document may have multiple page frames, the process described by Déjean may be repeated one or more times, if necessary, to match different computed page frames with the remaining pages of the document. The output of the page frame detection module 116 is, at most, one page frame 14 linked to each page 10 of the input set 104 of pages. Each page frame may be defined by its width $W_{pf}$, height $H_{pf}$ and, with respect to a given page, its location relative to the boundaries of the page.

The method of Déjean takes account of the fact that scanned pages often include noise which arises from the spine of the book being copied or from the next page to the one being scanned. By computing page frame dimensions (height $H_{pf}$ and width $W_{pf}$) over multiple pages, these noisy portions of the page content which fall within the bounding box can be excluded from the computed page frame.

Figure 6:
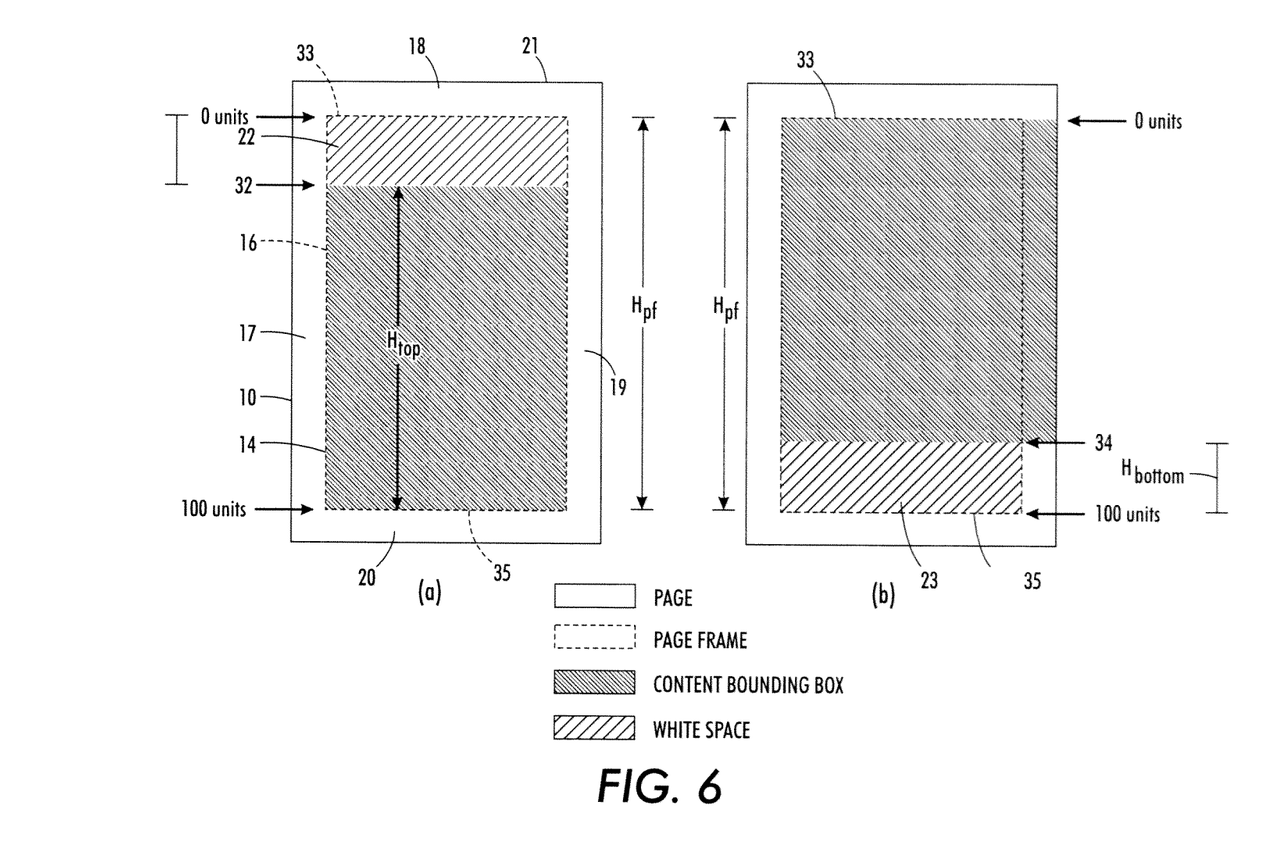
FIG. 6 graphically illustrates an exemplary method for measuring a ratio between the content bounding box and page frame of a document page in accordance with one aspect of the exemplary embodiment.

At S500, the page categorization module 120 categorizes each page 10 of the input set of pages 104 as an empty page, full page, leading page, trailing page, centered page, or noisy page depending on the geometrical relationship between the page frame 14 (FIGS. 1 and 2) and the bounding box 16. In the exemplary embodiment, the categorization module 120 calculates white space 22, 23 for each page by determining the area (or height) between the upper or lower end of the assigned page frame 14 and the upper or lower end of the content bounding box 16. FIG. 6 illustrates two example pages a) and b) having white space. Page (a) has white space 22 near the top of the page frame 14, and page (b) has white space 23 near the bottom of the page frame 14. The white space for any given page is helpful when distinguishing pages representative of a logical cut from other pages, e.g., when categorizing leading pages, trailing pages and centered pages. In some embodiments, white space is not explicitly calculated (since it can be considered negative space), but is inherently considered when comparing the location and size of content bounding boxes to page frames.

With respect to the page categories, an empty page is a page having no detected content (i.e., no content bounding box). Pages (f) and (j) of FIG. 4 illustrate examples of an empty page. These pages are generally not assigned a page frame.

A noisy page is a page with no detected page frame having at least one or a plurality of pixels that are non-white (i.e., the page has pixels that are 'on'). A noisy page may be caused by, for example, a blank page having an errant or stray mark caused by a reproduction error. In some embodiments, these can be simply considered as empty pages.

A leading page is a page 10 having a content bounding box 16 at or near the bottom of the page frame 14 and white space 22 occupying a substantial area (height) of the top portion of the page frame 14. The determination of whether a page has white space 22 occupying a substantial area of the top portion of the page frame 14 can be based on a ratio between the height ($H_{top}$) of the top white space 22 and the page frame height ($H_{pf}$). $H_{pf}$ is the vertical distance between the upper and lower ends 33, 35 of the page frame. $H_{top}$ is the vertical distance between the top edge 32 of the content bounding box 16 and the upper end 33 of the page frame. In the exemplary embodiment, the ratio (rl) is computed as:

$$rl = \frac{Htop}{Hpf} > 1 - \Theta, \quad (1)$$

where rl is the computed ratio for a leading page, $H_{pf}$ is the height of the page frame, $H_{top}$ is the vertical position of the top of the bounding box relative to the page frame, and $\theta$ is a threshold ratio. FIG. 6 illustrates generally the geometric relationship between $H_{top}$ and $H_{pf}$ of leading page (a), while pages (a) and (l) of FIG. 4 illustrate examples of leading pages within the context of an entire document.

$\theta$ can be, for example, at least 0.5, and can be at least 0.7 or at least 0.8 or at least 0.9 and is less than 1. Experimentally, a suitable value for $\theta$ has been found to be 0.90 for a given dataset (values between 0.50 and 0.95 have been tested on this dataset). Considering that an average of 40-50 lines are written on a page, a value of $\theta$ is 0.90 corresponds to roughly 3-5 empty lines. Below this threshold (i.e., when rl>1−Θ), the page is considered as a full page. Because of potential noise in the positioning of the page frame, and because of some layout conventions (such as no widowed line, orphaned words), it may be difficult to increase the value of $\theta$ in order to detect whitespaces corresponding to as few as 1 or 2 empty lines. Although decreasing the value of $\theta$ may make the method more precise (micro-averaged precision), recall may be too heavily impacted.

A trailing page is a page 10 having a content bounding box 16 at or near the top of the page frame 14 and white space 22 occupying a substantial area of the bottom portion of the page frame 14. The determination of whether a page has white space 22 occupying a substantial area of the bottom portion of the page frame 14 is based on a ratio between vertical height ($H_{bottom}$) of the lower white space 23 and the page frame height ($H_{pf}$) and the $H_{bottom}$ is the distance from the bottom edge 34 of the content bounding box 16 to a bottom edge 35 of the page frame. In the exemplary embodiment, the ratio (rt) is computed as:

$$rt = \frac{Hbottom}{Hpf} < \beta \quad (2)$$

where rt is the computed ratio for a trailing page, $H_{pf}$ is the height of the page frame, $H_{bottom}$ is the vertical position of the bottom of the bounding box relative to the page frame, and $\beta$ is a threshold ratio. FIG. 6 illustrates generally the geometric relationship between $H_{bottom}$ and $H_{pf}$ of leading page (b), while pages (d), (i) and (n) of FIG. 4 illustrate examples of trailing pages within the content of an entire document. $\beta$ can be, for example, at least 0.5, and can be at least 0.7 or at least 0.8 or at least 0.9 and is less than 1. In one embodiment, $\beta$ can have the same value as $\theta$. As discussed with respect to leading pages, a suitable value for $\beta$ can be 0.90.

A centered page is a page 10 having a content bounding box 16 centered vertically on the page 10 with roughly equal white space 22, 23 both above and below the content bounding box 16. In other words, for a centered page, the distance between the top edge 32 of the content bounding box 16 and the top edge 33 of the page frame 14 is roughly equal to the distance between the bottom edge 34 of the content bounding box 16 and the bottom edge 35 of the page frame 14. To identify a centered page, the heights of the two white spaces may be summed and expressed as a ratio of the page frame height. For example a centered page may be computed as:

$$rc = \frac{Htop + Hbottom}{Hpf} > 1 - \gamma, \quad (3)$$

where $\gamma$ can be, for example, the same as for $\theta$. The amount of permissible variation between the distances may vary depending upon the particular application. Pages (e), (g) and (k) of FIG. 4 illustrate examples of centered pages.

A full page is a page having a content bounding box with a size and location that is substantially equal to the size and location of the page frame. Mathematically, by extending equations (1) (2) and (3) a full page may have a ratio (rl)<1−θ, a ratio (rt)>β and a ratio (rc)<1−γ In such a situation, the value of the threshold ensures that the white space between the content bounding box 16 and the page 14 is below a certain threshold.

As will be appreciated, other methods than those illustrated can be used for determining whether the white space exceeds a predetermined threshold and whether it is associated with a leading, trailing, or centered page.

At S600, the logical unit detection module 122 determines whether the page categorized by the page categorization module 120 as being a logical cut is a first page (and/or, in some embodiments, a last page) of a logical unit in the document 12. The logical unit detection module 122 applies one or more rules to the input page categories to determine the page boundaries for logical units of the document. As noted above with respect to FIG. 3, a logical unit in a document includes a page labeled as a first page and all subsequent pages until the page immediately preceding the next page labeled as a first page (or until the end of the document if there is not another labeled first page). Thus, pages labeled as first pages are logical cuts in the document that signal the beginning of a logical unit, and by extension, the end of the logical unit immediately preceding the logical cut. The rules for determining logical units of the document can include, but are not limited to, one or more of: (1) labeling a page as the first page of a logical unit if the page is categorized as a leading page, (2) labeling a non-empty and non-noisy page as the first page of a logical unit if the page immediately preceding the page is categorized as a trailing page, and (3) labeling a page as the first page of a logical unit if the page is categorized as a centered page. After determining the logical unit cuts of the input document 104, the logical unit detection module 122 calculates page ranges for each logical unit of the document. Document pages can be accorded numbers based on a sequential numbering scheme and/or numbers extracted from the content of the document pages, where present.

Applying these example rules to the document pages of FIG. 4, pages (a) and (l) are classified as the beginning of a logical unit since they are leading pages. Pages (e), (g) and (k) also begin logical units since they are centered pages. Additionally, pages (e) and (k) begin logical units because they are the first non-empty and non-noisy pages following a trailing page. Accordingly, the page ranges for the logical units in the document of FIG. 4 are (a)-(d), (e)-(f), (g)-(j), (k), and (l)-(n).

At S700, if the categorized page 10, as determined by the logical unit detection module 122, is the first page of a logical unit, the title extraction module 124 may attempt to extract a title from the page. Any method of extracting a title from a document page now known or developed in the future may be used. In one exemplary embodiment, the module 122 considers the first line of the page to be the title, with the second line (and subsequent lines) also being considered part of the title if the length of the line(s) is smaller than a given threshold (such as 75% of the width of the page frame). In alternate embodiments, title extraction methods that utilize machine learning and training sets may be used to extract the title from the identified first pages.

At S800, if there are more pages to be processed in the document, the method returns to S400. Else, the method proceeds to optional step S900 or alternatively to S1000.

At S900, the table of contents module 126 constructs a table of contents for the input set 104 of document pages 10. The TOC may include the title of the first page of each logical unit and the page on which it occurs. The TOC may be expressed as an ordered list, e.g., in a displayable data structure, or in another suitable format, such as metadata, e.g., as XML tags. Alternatively, the table of contents module 126 verifies an existing table of contents for the input document pages 10 and outputs a metric indicating the similarity between the existing table of contents and the data generated by the logical unit detection module 122 and title extraction module 124. In the exemplary embodiment, the table of contents is generated by linking the titles extracted from the title extraction module 124 with the page ranges calculated by the logical unit detection module 122. The table of contents is associated with the document 104 and may be stored within the document 104 itself or separately as metadata. Thus, the generated table of contents may be used to navigate the document (such as during reading), or it can be used to segment the document into smaller units corresponding with the detected logical units. With respect to verifying an existing table of contents, the table of contents module 126 compares the extracted titles and page identification data (such as page numbers) with the existing table of contents data. The module 126 may then compute a similarity score (such as ranging from 0% to 100% similarity) that indicates how well the existing table of contents matches the detected logical units.

The method ends at S1000.

The method illustrated in FIG. 5 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 5, can be used to implement the method.

Without intending to limit the scope of the exemplary embodiment, the following examples demonstrate the application of the system and method.

EXAMPLES

A quantitative evaluation was performed on a dataset composed of 427 books, with known logical cuts, such as chapter breaks, manually determined as a groundtruth. The groundtruth was not used during the development and tuning of the method. TABLE 1 shows the results (labeled "Trailing Leading") using different θ, β and γ values and the results of the comparative method described in Giguet, et al. TABLE 1 shows macro-averaged precision, recall, and F-1 values for each of the methods. Macro-average precision/recall refers to an average value calculated across multiple books in a collection. As is known in the art, F-1 values combine the precision and recall values into one metric.

TABLE 1

| | Precision (macro-averaged) | Recall (macro-averaged) | F-1 (averaged) |
|---|---|---|---|
| Ginguet et al, 2009 | 64.3 | 37.1 | 47.05 |
| Trailing Leading ($\theta = 0.90$) | 74.1 | 55.9 | 57.3 |
| Trailing Leading ($\theta = 0.80$) | 75.0 | 43.4 | 49.7 |

As shown above, the exemplary method outperforms the comparative method (precision=74.1 for $\theta=\beta=0.90$). The low recall values (compared to the precision values) may be due to the presence of lower level entries in the groundtruth whose layout does not use trailing and leading conventions (such as sub-sections). Also some documents in the collection do not use trailing or leading pages at all. However, the exemplary method is much faster than other methods that are based on table of contents (e.g., less than 20 seconds for a 1000-page book).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for determining a structure of a document comprising multiple pages, the method comprising:
    receiving a set of document pages for a document into computer memory;
    linking a same one page frame to each of a plurality of document pages in the set having detected content, comprising:
        for each page in the set of document pages:
            determining dimensions of a content bounding box encompassing detected objects of the page, and
            determining margin dimensions, based on a position of the bounding box on the page;
        computing a page frame as a combination of the bounding box dimensions and the margin dimensions, based on frequencies of the bounding box dimensions and the margin dimensions computed for the set of pages; and
        matching the computed page frame to the plurality of pages;
    for each document page in the plurality of document pages having detected content which is linked to a same computed page frame:
        determining a content bounding box surrounding the content on the document page,
        categorizing the document page based on a geometrical relationship between the computed page frame and the content bounding box of the document page, and
        determining whether the document page constitutes a logical cut representing the beginning or end of a logical unit of the document based on the categorization of the document page, each logical unit comprising at least a first page; and
    outputting information based on the determined logical unit.

2. The method of claim 1, wherein at least one of the linking, determining a content bounding box, categorizing, and determining whether the document page constitutes a logical cut is performed with a computer processor.

3. The method of claim 1, wherein the determination of a content bounding box surrounding the content on the document page excludes content within a header or footer of the page.

4. The method of claim 1, further comprising:
    generating a table of contents for the document based at least in part on determined logical units.

5. The method of claim 1, further comprising:
    validating an existing table of contents for the document based at least in part on determined logical units.

6. The method of claim 1, further comprising:
    extracting a title for each document page determined to be the beginning of a logical unit.

7. The method of claim 6, wherein the extracted title is determined by utilizing machine learning and training sets.

8. The method of claim 6, wherein the extracted title is the first textual line of the page, and is combined with the second textual line of the page if the length of the second textual line is less than a given threshold.

9. The method of claim 1, wherein the categorizing of the document page comprises assigning a category based on the geometrical relationship between the computed page frame and the content bounding box of the document page, the category being selected from a predefined set of categories for document pages, the predefined set of categories including:
    an empty page, for a page with no detected content or no detected page frame,
    a full page,
    a leading page,
    a trailing page, and
    a centered page.

10. The method of claim 1, wherein the categorization comprises determining at least one vertical distance between the content bounding box and a respective adjacent horizontal edge of the page frame and determining whether the at least one vertical distance exceeds at least one of a threshold distance and a threshold ratio of the page frame height.

11. The method of claim 1, wherein a page is determined to be the beginning of a logical unit of the document wherein in the categorizing, at least one of:
    the page is categorized as a leading page;
    the page immediately preceding the page is categorized as a trailing page; and
    the page is categorized as a centered page.

12. The method of claim 1, wherein the linking of the page frame comprises:
    linking the computed page frame to matching pages of the set of document pages.

13. A system for performing the method of claim 1 comprising instructions stored in memory for performing the method and a computer processor in communication with the memory for executing the instructions.

14. A computer program product comprising a non-transitory recording medium encoding instructions, which when executed by a computer, perform the method of claim 1.

15. The method of claim 1, further comprising calculating page ranges for each logical unit of the document based on determined logical cuts.

16. A method for determining a structure of a document, comprising:

receiving a set of document pages for a document into computer memory;

linking one page frame to each of a plurality of document pages in the set, comprising:

for each page in the set of document pages:
determining dimensions of a content bounding box encompassing detected objects of the page, and determining margin dimensions, based on a position of the bounding box on the page; and computing a page frame as a combination of the bounding box dimensions and margin dimensions, based on frequencies of the bounding box dimensions and the margin dimensions computed for the set of pages;

for each document page linked to the computed page frame:

determining a content bounding box surrounding the content on the document page, categorizing the document page based on a geometrical relationship between the computed page frame and the content bounding box of the document page, and determining whether the document page constitutes a logical cut for a beginning or end of a logical unit of the document based on the categorization of the document page; and outputting information based on the determined logical unit, the categorizing of the document page comprising assigning a category selected from a predefined set of categories for document pages, the predefined set of categories including:

an empty page, which is defined as a document page having at least one of no page frame and no content bounding box;

a full page, which is defined as a document page having a content bounding box with a size and location substantially equal to the page frame;

a leading page, which is defined as a document page having a content bounding box with a top edge located at at least a threshold distance away from the top edge of the page frame;

a trailing page, which is defined as a document page having a content bounding box with a bottom edge located at a threshold distance away from the bottom edge of the page frame; and a centered page, which is defined as a document page having a content bounding box with a top edge located a first distance away from the top edge of the page frame, and a bottom edge located at a second distance substantially equal to the first distance away from the bottom edge of the page frame.

17. The method of claim 16, wherein the linking of one page frame for each of a plurality of document pages in the set comprises:

matching the computed page frame to pages of the set of document pages to detect page frames for the matched pages.

18. The method of claim 16, wherein the threshold distance used in the categorization of a leading page and a trailing page is at least ten percent of a height of the page frame.

19. A system for determining the structure of a document, comprising:

memory for storing a set of document pages for a document and storing modules, the modules comprising:

a content bounding box detection module to, for each page of the set of document pages, determine a content bounding box surrounding the content on the document page;

a page frame detection module to link at most one page frame for each page in the set of document pages, the page frame having been identified based on the content of multiple pages of the document, the page frame being computing as a combination of bounding box dimensions and margin dimensions, based on frequencies of the bounding box dimensions and the margin dimensions computed for the set of document pages;

a page categorization module to, for each page of the set of document pages, categorize the document page based at least in part on the geometrical relationship between the computed page frame and the content bounding box of the document page; and a logical unit detection module to, for a page in the set of document pages, determine whether the document page constitutes a logical cut representing the beginning or end of a logical unit of the document, based on the categorization of the document page, each logical unit including at least a respective first page and all subsequent pages until a page immediately preceding a next page labeled as a first page or until an end of the document if there is not another labeled first page; and a computer processor which implements at least one of the modules.

20. The system of claim 19, wherein the page frame detection module is further to:

match the computed page frame to pages of the set of document pages to detect page frames for the matched pages.

21. The system of claim 19, wherein the content bounding box detection module excludes content within a header or footer of the page when determining the content bounding box surrounding the content on the document page.

22. The system of claim 19, further comprising a table of contents module to generate a table of contents for the document based at least in part on determined logical units of the document.

23. The system of claim 19, further comprising a table of contents module to validate an existing table of contents for the document based at least in part on the determined logical units.

24. The system of claim 19, further comprising a title extraction module to extract a title for each document page determined to be the beginning of a logical unit.

25. The system of claim 19, wherein the logical unit detection module determines that the document page is the beginning of a logical unit if at least one of:

the page is categorized as a leading page;

the page immediately preceding the page is categorized as a trailing page; and the page is categorized as a centered page.

26. A computer program product comprising a non-transitory recording medium encoding instructions, which when executed on a computer causes the computer to perform the following:

receiving a set of document pages for a document into computer memory;

linking at most one page frame to each of a plurality of document pages in the set, the page frame having been identified based on the content of multiple pages of the document by:

computing a page frame as a combination of bounding box dimensions and margin dimensions, based on frequencies of the bounding box dimensions and the margin dimensions computed for the set of pages, and matching the computed page frame to the plurality of pages; for each document page linked to the computed page frame:

determining a content bounding box surrounding the content on the document page, categorizing the document page based on a geometrical relationship between the computed page frame and the content bounding box of the document page, the categorizing comprising determining whether the geometrical relationship indicates one of a trailing page and a leading page, and determining whether the document page constitutes a logical cut for a logical unit of the document based on the categorization of the document page, whereby each logical unit includes a page labeled as a first page and all subsequent pages until the page immediately preceding the next page labeled as a first page, or until the end of the document if there is not another labeled first page; and associating information with the document based on identified logical cuts within the document.

* * * * *